(No Model.)

W. G. RICHARDS.
PIPE COUPLING.

No. 398,448. Patented Feb. 26, 1889.

Witnesses
H. C. Newman
E. L. Newman

Inventor
WILLIAM G. RICHARDS,
By his Attorney
Geo. H. Benjamin

UNITED STATES PATENT OFFICE.

WILLIAM G. RICHARDS, OF NEW YORK, N. Y., ASSIGNOR OF ONE-HALF TO GEORGE H. BENJAMIN, OF SAME PLACE.

PIPE-COUPLING.

SPECIFICATION forming part of Letters Patent No. 398,448, dated February 26, 1889.

Application filed April 18, 1888. Serial No. 271,099. (No model.)

*To all whom it may concern:*

Be it known that I, WILLIAM G. RICHARDS, a citizen of the United States, residing in the city, county, and State of New York, have invented an Improvement in Pipe-Couplings, of which the following is a specification.

The purpose of my invention is to provide in a coupling for flexible pipes suitable and simple means for effecting a union between two halves of the coupling which shall be steam-tight, and for securing a perfect bearing between the packing-faces of the two halves.

Another object of my invention is to furnish a chamber through the coupling which shall present the least resistance to the passage of steam or other fluid through it.

Another object is to afford means for the automatic separation of the two halves of the coupling when a strain is applied to the tubes which they connect.

Figure 1:
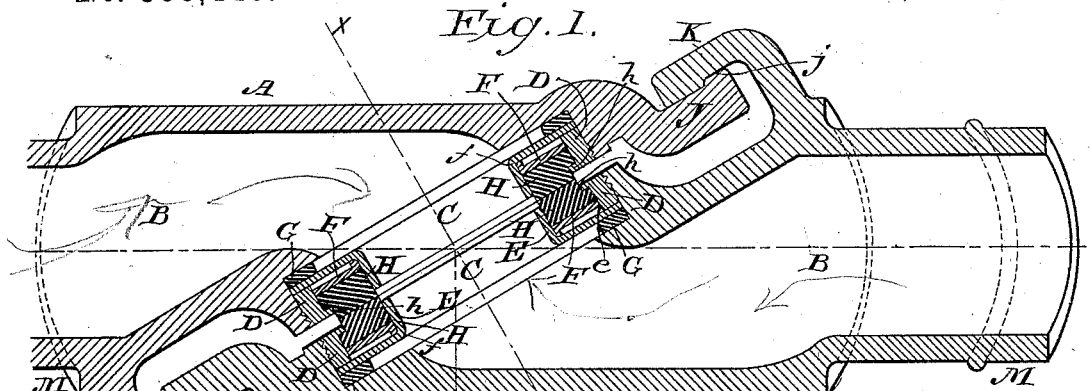
Figure 2:
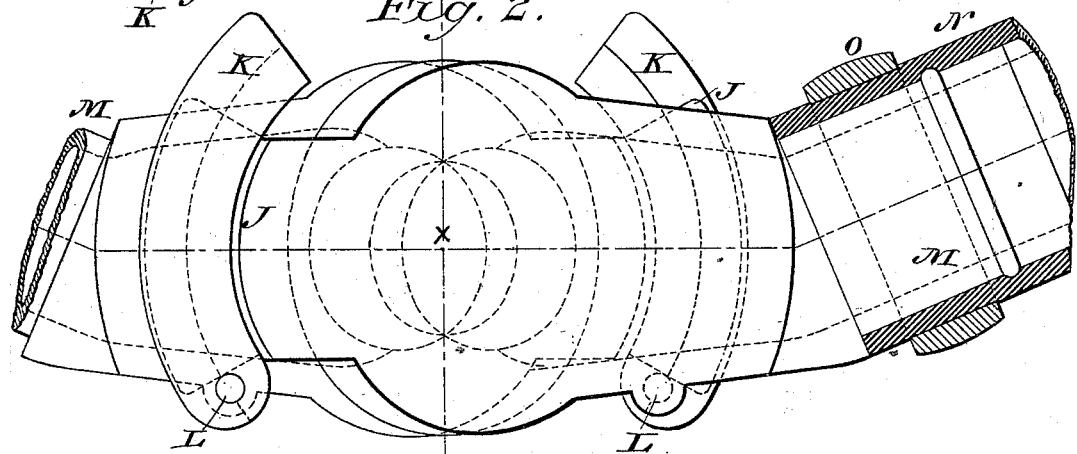
Figure 5:
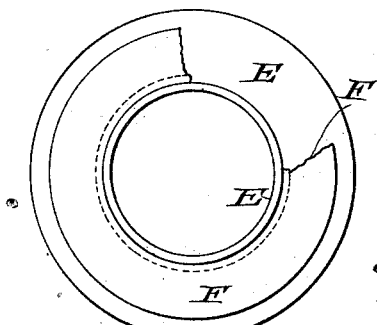
Figure 3:
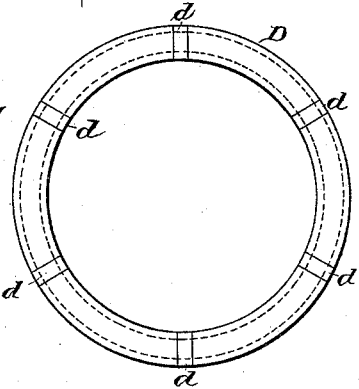
Figure 4:
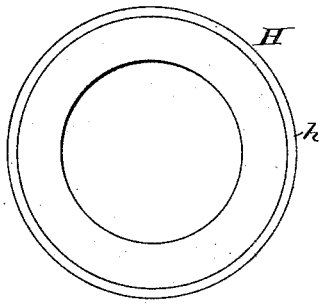

In the accompanying drawings, Figure 1 is a longitudinal horizontal section through the coupling and packing-rings. Fig. 2 is an elevation of the two halves of the coupling locked together. Fig. 3 is a plan of the threaded ring D of Fig. 1. Fig. 4 is a plan of the packing-ring H of Fig. 1. Fig. 5 is a plan of the spring-rings E and F of Fig. 1.

Referring to the letters on the drawings, A A indicate two halves of a coupling which are identical in all their details. The same letters are therefore used to designate similar parts in each half.

B indicates the main passage within the coupling, and is curved to form the port C, the plane of whose face forms an obtuse angle with the main axis of the passage.

D indicates a threaded ring provided with wrench-slots $d\,d$, and made to screw upon the rings E and H and hold all the parts in place.

E shows an annular cylinder, the annular base in contact with the ring D acting as a support for the cylindrical center, which forms the wall of the port C.

F represents an annular spring which occupies a space between the ring D and annular cylinder E. It may be stamped out of a single plate of metal, so as to be in form two parallel rings united at the inner circle by a bend, which yieldingly separates the rings, thereby giving them a spring action. The spring F may also be made, if preferred, without a lower ring or base, and may be brazed to the cylinder E, so as to keep it parallel to the annulus of the cylinder and give it the spring action it requires. This is the construction shown in the accompanying drawings. It is evident that this mode of construction does not in the least vary the principle of action in the springs nor substantially its characteristic form.

G indicates packing between the annular cylinder E and the body of the coupling.

H represents a packing-ring of rubber or any other elastic material, which has its seat upon the spring F, and is provided around its upper edge with a shoulder, $h$, made to bear against a similar shoulder on the ring D. In use the face of this ring extends a little beyond the body of each half of the coupling.

J indicates a wing, and K a hook on the rim of each half of the coupling, each being provided, respectively, with beveled or rounded projections $i$ and $k$, which, when the halves are in position for use, bear against each other.

L L show stops upon the hooks K.

M indicates the ends of the coupling, which are inclined to its main axis.

N represents a pipe, and O a band for fastening the coupling to the pipe.

In operation, in order to lock the coupling for use, the two halves are brought together, the ports C C coinciding, the parts A A nearly at right angles to each other, and the wings J in position to slide under the hooks K. Then the two halves are revolved about the axis X X toward the same right line until further motion is prevented by the wings J coming against the stops L. (See Fig. 2.) In this position the faces of the packing-rings are pressed and firmly held together and form a close union. Ordinarily, where an elastic material is twisted against a surface of similar material, the evenness of contact is distorted and a true union prevented. To obviate this difficulty, I have provided the spring F and the annular cylinder E. As soon as pressure is exerted upon the ring H it is communicated to the spring F and the annulus of the cylinder E. The latter supported by the packing C also acts as a spring. It is evident that a force exerted upon the ring H depresses the spring F at e and the annulus of the cylinder E at f, but that it does not disturb their relative positions. They still remain parallel. In this manner they preserve an even surface to the ring H and insure a true union between them.

The fashioning of the port C at an obtuse angle with the main axis of the coupling avoids an abrupt change of direction of the transmitted fluid within the pipes, which causes undue resistance in other couplings. The inclination of the ends M of the coupling to its main axis serves to secure the locked position to the parts when they hang joined together in their proper position; but as soon as a strain is exerted upon the pipes which the coupling connects the inclination of its ends is such that the halves of the coupling revolve and part. This construction also affords a convenient means of disconnecting the parts when desired.

I do not limit myself to the exact form or relation of parts shown, as they may be variously modified without departing from my invention.

I claim as my invention—

1. In a two-part pipe-coupling, the combination of bearing-faces consisting of elastic packing material with an annular spring consisting substantially of two separated parallel annular leaves joined together at their inner edges to support the packing material, substantially as set forth.

2. In a two-part pipe-coupling, the combination of a chamber in each part of the coupling, packing material in the chamber, and an annular spring consisting of two separated parallel annular leaves joined together at their inner edge, substantially as set forth.

3. In a two-part pipe-coupling, the combination in each part of a ring of packing material, an annular spring for supporting the packing material, and an annular cylinder containing the same, all united and secured to the coupling, substantially as set forth.

4. In a two-part pipe-coupling, the combination at each part of a bearing-faced packing-ring and supporting-rings beneath the packing-ring with an annular cylinder containing and supporting the same, and a threaded ring adapted to screw into the body of the coupling for holding the parts together, substantially as set forth.

In witness whereof I have hereunto set my hand and affixed my seal this 22d day of March, 1888.

WILLIAM G. RICHARDS. [L. S.]

Witnesses:
F. K. BUDD,
D. W. BROWN.